(12) United States Patent
Ryu et al.

(10) Patent No.: US 9,690,326 B2
(45) Date of Patent: Jun. 27, 2017

(54) WEARABLE DISPLAY DEVICE

(71) Applicant: SAMSUNG DISPLAY CO., LTD., Yongin-si, Gyeonggi-Do (KR)

(72) Inventors: An Na Ryu, Hwaseong-si (KR); Mu Gyeom Kim, Hwaseong-si (KR); Hee Soo Yoo, Seoul (KR); Kwang Hoon Lee, Anyang-si (KR); Myoung Jin Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/975,087

(22) Filed: Dec. 18, 2015

(65) Prior Publication Data
US 2016/0224070 A1 Aug. 4, 2016

(30) Foreign Application Priority Data

Feb. 2, 2015 (KR) ........................ 10-2015-0016352

(51) Int. Cl.
| G06F 1/16 | (2006.01) |
|---|---|
| G02C 3/04 | (2006.01) |
| G02C 5/00 | (2006.01) |
| G02C 5/04 | (2006.01) |
| G02B 27/01 | (2006.01) |
| G02C 5/14 | (2006.01) |

(52) U.S. Cl.
CPC ......... *G06F 1/163* (2013.01); *G02B 27/0176* (2013.01); *G02C 3/04* (2013.01); *G02C 5/006* (2013.01); *G02C 5/04* (2013.01); *G02C 5/143* (2013.01); *G06F 1/1656* (2013.01)

(58) Field of Classification Search
CPC ................. G06F 1/163; G02B 2027/0178
USPC ...................................... 361/679.03
See application file for complete search history.

(56) References Cited

U.S. PATENT DOCUMENTS

| 6,193,368 | B1 | 2/2001 | George |
|---|---|---|---|
| 6,424,321 | B1 | 7/2002 | Ronzani et al. |
| 7,740,353 | B2 * | 6/2010 | Jannard ................ A61B 5/1112 351/158 |
| 8,645,604 | B2 | 2/2014 | Fino |
| 8,947,322 | B1 * | 2/2015 | Chi ...................... G02B 27/017 345/156 |
| 9,329,391 | B2 * | 5/2016 | Park ................... G02B 27/0176 |
| 2006/0203084 | A1 | 9/2006 | Okazaki et al. |

(Continued)

FOREIGN PATENT DOCUMENTS

| GB | 423641 | 2/1935 |
|---|---|---|
| KR | 1020080113815 | 12/2008 |

(Continued)

OTHER PUBLICATIONS

European Research Report Dated Jun. 20, 2016.
European Search Report Dated Sep. 21, 2016 Corresponding to European Patent Application No. 15195824.6.

*Primary Examiner* — Nidhi Thaker
(74) *Attorney, Agent, or Firm* — F. Chau & Associates, LLC

(57) ABSTRACT

A wearable display device includes a display unit configured to transmit an image, a first housing having a first end connected to the display unit, a second housing having a first end disposed opposite to the first end of the first housing, and a sliding unit configured to slidably connect the first housing and the second housing to each other.

19 Claims, 9 Drawing Sheets

(56) References Cited

U.S. PATENT DOCUMENTS

| | | | |
|---|---|---|---|
| 2008/0144264 A1* | 6/2008 | Cosgrove | G02B 27/017 361/600 |
| 2008/0198324 A1* | 8/2008 | Fuziak | G02B 27/0172 351/158 |
| 2012/0105740 A1* | 5/2012 | Jannard | G02C 9/04 348/794 |
| 2012/0194418 A1* | 8/2012 | Osterhout | G02B 27/0093 345/156 |
| 2013/0022220 A1 | 1/2013 | Dong et al. | |
| 2013/0182334 A1 | 7/2013 | Sugihara et al. | |
| 2013/0258269 A1 | 10/2013 | Shalon | |
| 2014/0043214 A1* | 2/2014 | Park | G06F 1/163 345/8 |
| 2014/0218852 A1* | 8/2014 | Alcazar | G06F 1/163 361/679.03 |
| 2015/0301360 A1* | 10/2015 | Chow | G02C 11/10 351/158 |
| 2016/0098138 A1* | 4/2016 | Park | G06F 3/0416 345/173 |

FOREIGN PATENT DOCUMENTS

| | | |
|---|---|---|
| KR | 1020110080915 | 7/2011 |
| WO | 2014093284 | 6/2014 |

\* cited by examiner

WEARABLE DISPLAY DEVICE

CROSS-REFERENCE TO RELATED APPLICATIONS

This application claims priority under 35 U.S.C. §119 to Korean Patent Application No. 10-2015-0016352 filed on Feb. 2, 2015, the disclosure of which is incorporated by reference herein in its entirety.

TECHNICAL FIELD

Exemplary embodiments of the present invention relate generally to a wearable display device, and more particularly, to a wearable display device that may be attached to a body part such as a head, an arm, or a leg.

DISCUSSION OF THE RELATED ART

A display device is a device that displays an image. With recent developments in display device technology, the field of use of display devices has increased to include, for example, a wearable display device such as a smartwatch and a head-mounted display (HMD), as well as a portable mobile communication terminal such as, for example, a smartphone, a tablet PC, and a PDA. A wearable display device may utilize artificial reality (AR) and may be substituted for traditional glasses. An example of such a device is GOOGLE GLASS.

SUMMARY

Exemplary embodiments of the present invention provide a wearable display device which is compatible with various portable terminals (e.g., smartphones) such that the wearable display device may be charged or may transfer data without requiring a separate charging dock or a separate data storage device, thereby improving portability and compatibility.

According to an exemplary embodiment of the present invention, a wearable display device includes a display unit configured to transmit an image, a first housing having a first end connected to the display unit, a second housing having a first end disposed opposite to the first end of the first housing, and a sliding unit configured to slidably connect the first housing and the second housing to each other.

In an exemplary embodiment, the first housing and the second housing are each formed in an L shape.

In an exemplary embodiment, the wearable display device further includes a cover coupled to the first housing and configured to slide along an outer portion of the first housing to cover at least a part of the display unit.

In an exemplary embodiment, the wearable display device further includes two or more first recessed portions formed in one surface of the first housing.

In an exemplary embodiment, the wearable display device further includes a first rotational articulation member rotatably coupled to a second end of the first housing.

In an exemplary embodiment, the first rotational articulation member includes a first hinge rotatably coupled to the second end of the first housing, a first ball hingedly coupled to the first hinge, and a first socket including a U-shaped fitting groove shaped and dimensioned to receive the first ball.

In an exemplary embodiment, the wearable display device further includes a third housing connected to the first rotational articulation member.

In an exemplary embodiment, the third housing includes a first contact terminal hingedly and rotatably coupled to one surface of the third housing.

In an exemplary embodiment, the wearable display device further includes two or more second recessed portions formed in one surface of the second housing.

In an exemplary embodiment, the wearable display device further includes a second rotational articulation member rotatably coupled to a second end of the second housing.

In an exemplary embodiment, the second rotational articulation member includes a second hinge rotatably coupled to the second end of the second housing, a second ball hingedly coupled to the second hinge, and a second socket including a U-shaped fitting groove shaped and dimensioned to receive the second ball.

In an exemplary embodiment, the wearable display device further includes a fourth housing connected to the second rotational articulation member.

In an exemplary embodiment, the fourth housing includes a second contact terminal hingedly and rotatably coupled to one surface of the fourth housing.

In an exemplary embodiment, the sliding unit includes a first frame disposed at the first end of the first housing and extending toward the first end of the second housing, a second frame disposed at the first end of the second housing and extending toward the first end of the first housing, and a stopper block configured to receive the first frame and the second frame. The first frame and the second frame penetrate the stopper block.

In an exemplary embodiment, the sliding unit further includes a first wire member extending from the stopper block toward the first frame in a first direction in which the first frame extends, and a second wire member extending from the stopper block in a second direction in which the second frame extends.

In an exemplary embodiment, the wearable display device further includes an accommodating groove formed in the first end of the second housing and shaped and dimensioned to receive the stopper block.

According to an exemplary embodiment of the present invention, a wearable display device includes a display unit configured to transmit an image, a first housing having a first end connected to the display unit and a plurality of first recessed portions formed in one surface of the first housing, a second housing having a first end disposed opposite to the first end of the first housing and a plurality of second recessed portions formed in one surface of the second housing, a sliding unit configured to slidably connect the first housing and the second housing to each other, a first rotational articulation member rotatably coupled to a second end of the first housing, a second rotational articulation member rotatably coupled to a second end of the second housing, a third housing connected to the first rotational articulation member, and a fourth housing connected to the second rotational articulation member.

In an exemplary embodiment, the first rotational articulation member includes a first hinge rotatably coupled to the second end of the first housing, a first ball hingedly coupled to the first hinge, and a first socket including a fitting groove shaped and dimensioned to receive the first ball. Further, the second rotational articulation member includes a second hinge rotatably coupled to the second end of the second housing, a second ball hingedly coupled to the second hinge, and a second socket including a fitting groove shaped and dimensioned to receive the second ball.

In an exemplary embodiment, the sliding unit includes a first frame disposed at the first end of the first housing and extending toward the first end of the second housing, a second frame disposed at the first end of the second housing and extending toward the first end of the first housing, a stopper block configured to receive the first frame and the second frame, and an accommodating groove formed in the first end of the second housing and shaped and dimensioned to receive the stopper block. The first frame and the second frame penetrate the stopper block In an exemplary embodiment, the sliding unit further includes a first wire member extending from the stopper block toward the first frame in a first direction in which the first frame extends, and a second wire member extending from the stopper block in a second direction in which the second frame extends.

The wearable display device according to exemplary embodiments of the present invention may be attached to a body part such as a head, an arm, or a leg, and may be fixed to a mobile communication terminal (e.g., a smartphone) or the like when the wearable display device is not attached to the body of the user. As a result, the wearable display device may be conveniently carried and stored. In addition, the wearable display device may be electrically connected with the mobile communication terminal. As a result, even though a separate charging dock or a separate data storage device may not be provided or available, the display device may be charged via the mobile communication terminal (or vice versa), and data may be exchanged between the mobile communication terminal and the wearable display device. Thus, the wearable display device according to exemplary embodiments of the present invention provides a high degree of portability and compatibility.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
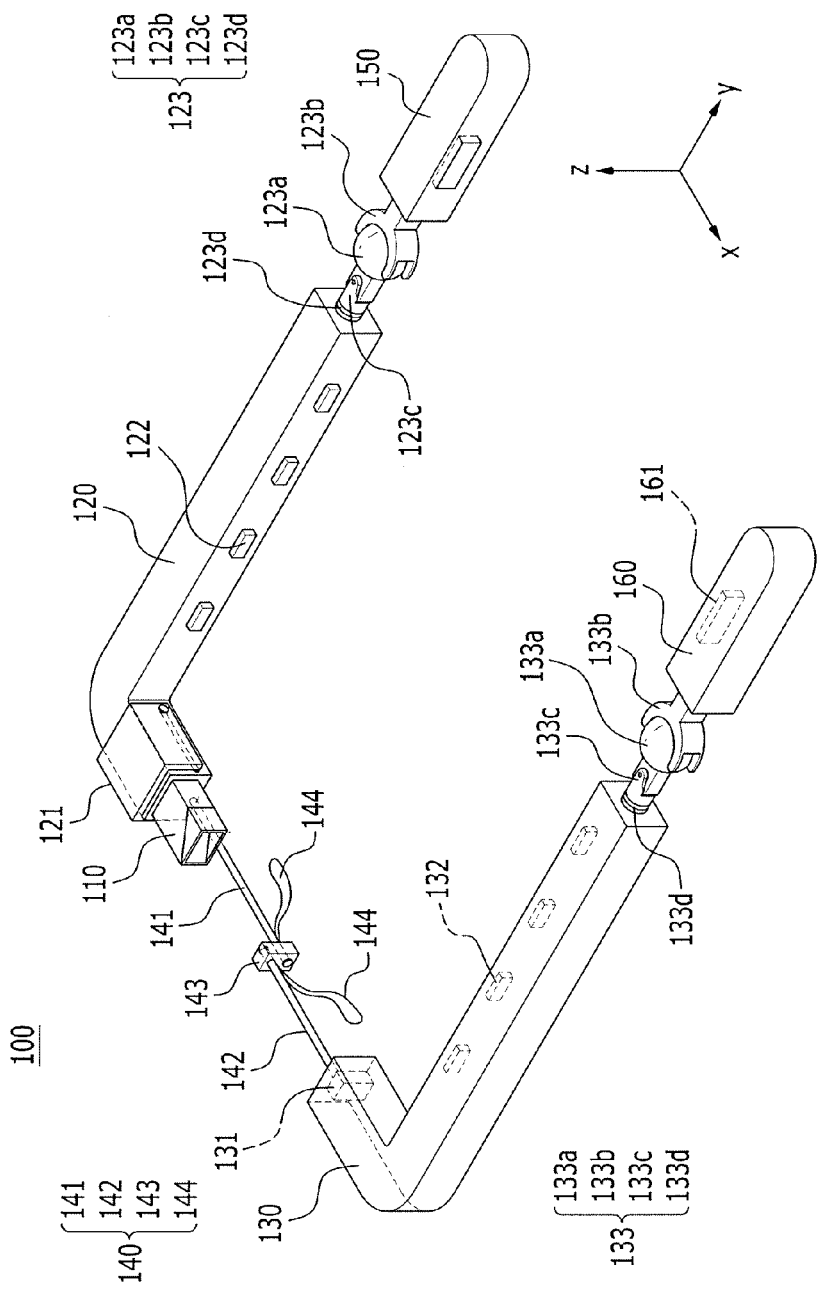
FIG. 1 is a view illustrating a wearable display device according to an exemplary embodiment of the present invention.

Exemplary embodiments of the present invention will be described more fully hereinafter with reference to the accompanying drawings. Like reference numerals may refer to like elements throughout the accompanying drawings.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. In addition, it will be understood that when an element is referred to as being "on", "connected to", "coupled to", or "adjacent to" another element, it can be directly on, connected, coupled, or adjacent to the other element, or intervening elements may be present. It will also be understood that when an element is referred to as being "between" two elements, it can be the only element between the two elements, or one or more intervening elements may also be present.

It will also be understood that the terms "first," "second," "third," etc. are used herein to distinguish one element from another, and the elements are not limited by these terms. Thus, a "first" element in an exemplary embodiment may be described as a "second" element in another exemplary embodiment.

FIG. 1 is a view illustrating a wearable display device according to an exemplary embodiment of the present invention.

A wearable display device 100 according to an exemplary embodiment may be attached to a human body. For example, the wearable display device 100 may be attached to various portions of a human body such as a head, an arm, or a leg. In a case in which the wearable display device 100 is attached to a user's head, the wearable display device 100 may be adjusted to transmit images directly to the eyes of a user. In a case in which the wearable display device 100 is attached to a user's arm or leg, the wearable display device 100 may be adjusted to project images onto a predetermined external space (e.g., a projector screen, a wall, etc.).

Referring to FIG. 1, the wearable display device 100 according to an exemplary embodiment includes a display unit 110, a first housing 120, a second housing 130, a sliding unit 140, a third housing 150, and a fourth housing 160.

The display unit 110 may include two or more lenses and two or more optical systems, and may transmit images to the eyes of the user or project images onto a predetermined external space using the lenses and the optical systems. The display unit 110 may be made of a transparent material to project images. In a case in which the wearable display device 100 illustrated in FIG. 1 is attached to a user's head, the wearable display device 100 may be used as glasses. When used as glasses, the display unit 110 of the wearable display device 100 is spaced apart from a front side of the eyes of the user in a y-axis direction and is disposed in parallel with the front side of the eyes of the user. The wearable display device 100 may also be used as a wrist watch (e.g., a smartwatch) by being attached to a wrist so that the display unit 110 is positioned near the back of the user's hand.

Although the wearable display unit 110 shown in FIG. 10 has a hexahedral shape, exemplary embodiments of the present invention are not limited thereto. For example, according to exemplary embodiments, the wearable display unit 110 may have various shapes such as a spherical shape, a circular shape, etc., in accordance with the purpose of the wearable display device 100 and the area in which the wearable display device 100 is to be attached.

A first end (e.g., a front end) of the first housing 120 may be connected to the display unit 110. The first housing 120 includes a hollow space formed therein, and a circuit unit that transmits an image signal to the display unit 110 may be positioned in the hollow space of the first housing 120. In exemplary embodiments, the hollow space and the circuit unit may be disposed on a different portion of the wearable display device 100. As illustrated in FIG. 1, the first housing 120 is formed in an L shape, and may serve as an arm of the glasses which comes into contact with an upper portion of a user's temple when the user wears the wearable display device 100 on his or her head. The first housing 120 may be made of a flexible material so that the first housing 120 may be wound around a wrist, an ankle, etc.

Figure 2:
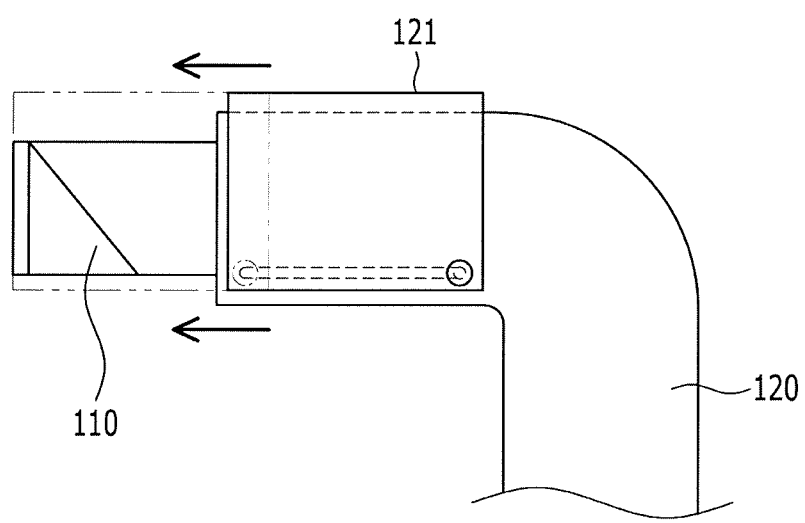
FIG. 2 is an enlarged view of a display unit of the wearable display device shown in FIG. 1 according to an exemplary embodiment of the present invention.

FIG. 2 is an enlarged view of the display unit of the wearable display device shown in FIG. 1 according to an exemplary embodiment of the present invention.

Referring to FIGS. 1 and 2, a cover 121 is slidably coupled to an outer portion of the first housing 120 in an area adjacent to the display unit 110. As illustrated in FIG. 2, the cover 121 may slide along the first housing 120 in a direction corresponding to the arrows in FIG. 2, and may cover at least a part of an outer portion of the display unit 110. In an exemplary embodiment, the cover 121 is a U-shaped structure, and may cover and protect multiple surfaces. For example, the cover 121 may cover and protect a z-axis directional surface and a y-axis directional surface of the display unit 110 as shown in FIG. 1. However, exemplary embodiments are not limited thereto. For example, in exemplary embodiments, the shape of the cover 121 and a range of movement that the cover 121 is capable of are not limited thereto. That is, the cover 121 may have various sizes and shapes in accordance with the purpose, use environment, etc. of the wearable display device 100. By virtue of the cover 121, the display unit 110 may be prevented from being damaged due to, for example, weather (e.g., snow or rain), or due to inflow of external foreign substances such as, for example, sweat or dust when the user uses the wearable display device 100 outdoors.

First recessed portions 122 are formed within regions at which the first housing 120 comes into contact with the user when the user wears the wearable display device 100. As shown in FIG. 1, the first recessed portions 122 may be formed in an x-axis directional surface of the first housing 120. The number of first recessed portions 122 may be two or more, and the first recessed portions 122 may extend along the y-axis direction of FIG. 1. In exemplary embodiments, the first recessed portions 122 are formed only in one surface of the first housing 120. For example, as shown in FIG. 1, the first recessed portions 122 are formed only in a lateral side of the first housing 120 and not in an upper side of the first housing 120 that extends from the lateral side (e.g., the upper side refers to the side of the first housing 120 at which the display unit 110 and cover 121 are disposed).

Figure 3:
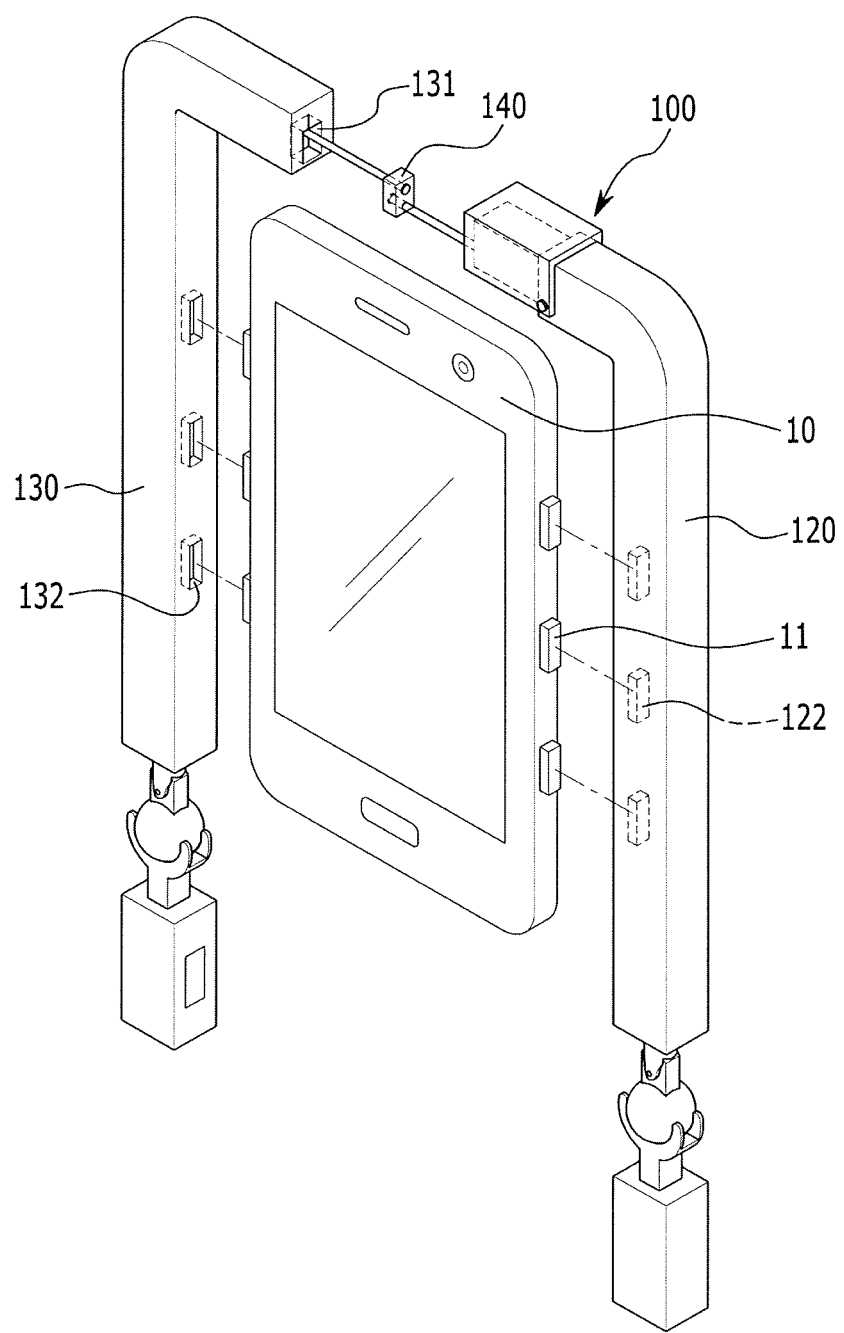
FIG. 3 is a view illustrating the wearable display device according to an exemplary embodiment of the present invention connected to a portable terminal.

FIG. 3 is a view illustrating the wearable display device according to an exemplary embodiment of the present invention connected to a portable terminal.

Referring to FIG. 3, when connected to each other, the wearable display device 100 may surround a first side (e.g., an upper side), a first lateral side, and a second lateral side of a general portable terminal 10. The lateral sides extend from and are adjacent to the upper side, and the lateral sides face each other, as shown in FIG. 3. The portable terminal 10 may be, for example, a mobile electronic device such as a smartphone. However, the portable terminal 10 is not limited thereto.

As illustrated in FIG. 3, in a case in which two or more protruding portions 11 (e.g., notches) are formed on both lateral sides of the portable terminal 10, the protruding portions 11 are inserted into the first recessed portions 122, respectively, such that the portable terminal 10 and the wearable display device 100 are attached to each other. As described above, the wearable display device 100 may be attached to the portable terminal 10 when the wearable display device 100 is not attached to the body of the user, allowing the wearable display device 100 to be conveniently stored and carried when the user is not wearing the wearable display device 100.

Figure 4:
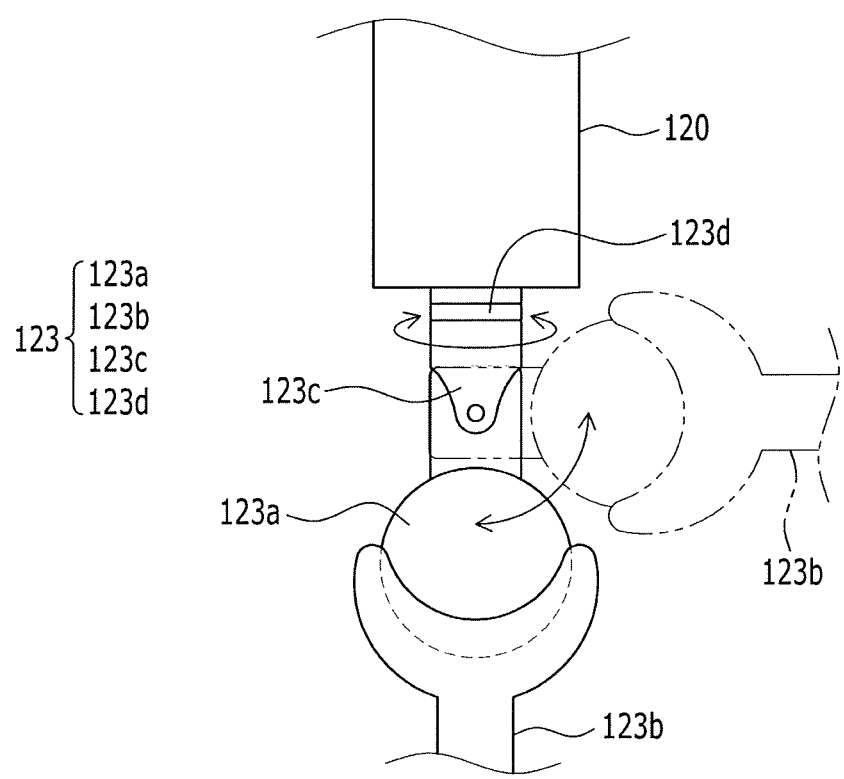
FIGS. 4 and 5 are views schematically illustrating a rotational motion of a first rotational articulation member of the wearable display device according to an exemplary embodiment of the present invention.
Figure 5:
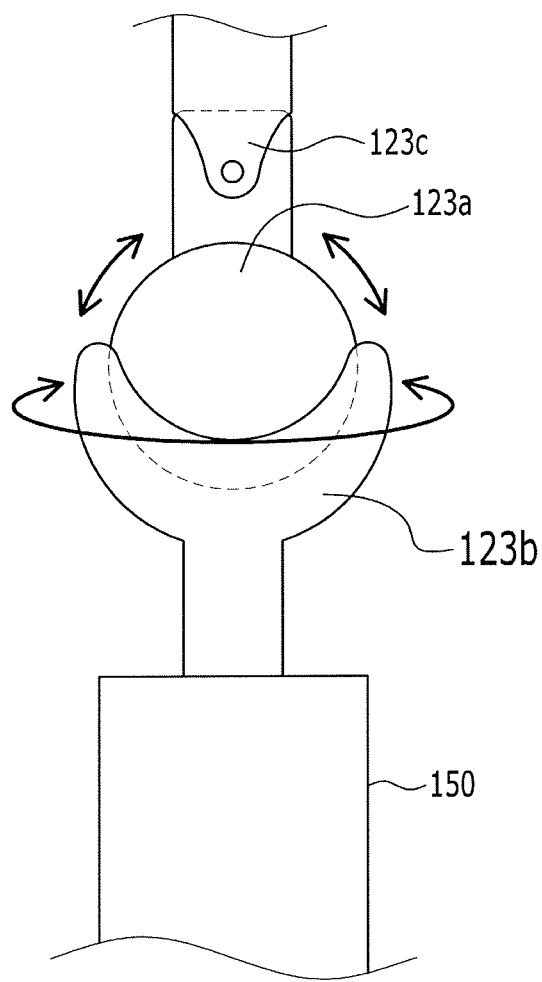

FIGS. 4 and 5 are views schematically illustrating a rotational motion of a first rotational articulation member of the wearable display device according to an exemplary embodiment of the present invention.

Hereinafter, a configuration and a rotational motion of the first rotational articulation member of the wearable display device according to an exemplary embodiment will be described with reference to FIGS. 4 and 5.

A first rotational articulation member 123 is a structure that is coupled to an end of the first housing 120 that is opposite the end nearest the display unit 110 and the cover 121. For example, the display unit 110 and the cover 121 may be described herein as being disposed at a first/front end of the first housing 120, and the first rotational articulation member 123 may be described herein as being disposed at an opposing second/rear end of the first housing 120. Hereinafter, the terms first/front end and second/rear end may be used in this context when describing the first housing 120. The first rotational articulation member 123 is rotatably fixed to the first housing 120. In an exemplary embodiment, the first rotational articulation member 123 includes a first ball 123a, a first socket 123b, a first hinge 123c, and a first bearing 123d. The first rotational articulation member 123 may perform two or more different and complex rotational motions.

As illustrated in FIG. 4, a fitting groove shaped and dimensioned to receive the first ball 123a therein is formed in a surface of the first socket 123b that is in contact with the first ball 123a. As illustrated in FIG. 5, the surface of the first socket 123b that is opposite to the surface in which the fitting groove is formed is connected to the third housing 150. The fitting groove of the first socket 123b may be formed in a U shape such that the first ball 123a may be smoothly fitted into the fitting groove, and such that the first ball 123a fitted into the fitting groove is not pulled out from the first socket 123b once inserted.

The first ball 123a and the first socket 123b are coupled to each other as described above. As a result, the first ball 123a may be rotated along multiple axes. For example, as shown in FIG. 5, the first ball 123a may be rotated in an up and down direction or in a left and right direction.

The first hinge 123c may be rotatably coupled to the rear end of the first housing 120. As illustrated in FIG. 4, the first hinge 123c may be rotated about a center rotation axis, which is defined as a direction in which the first housing 120 and the first hinge 123c are coupled to each other. The first hinge 123c is hingedly coupled to the first ball 123a such that the first ball 123a and the first socket 123b may be simultaneously and hingedly rotated, as indicated by the elements drawn with dotted lines in FIG. 4 and by the arrow pointing to each position of the first socket 123b in FIG. 4.

The first bearing 123d is disposed between the rear end of the first housing 120 and the first hinge 123c. The first bearing 123d supports the loads of the first hinge 123c and the first housing 120, and allows the first hinge 123c to be rotated about the center rotation axis that is defined as the direction in which the first housing 120 and the first hinge 123c are coupled to each other.

As described above, according to exemplary embodiments of the present invention, the first rotational articulation member 123 of the wearable display device 100 is configured to simultaneously perform the rotation (e.g., a first rotation) that is performed by the configuration in which the first ball 123a and the first socket 123b are coupled to each other, the rotation (e.g., a second rotation) that is performed by the configuration in which the first hinge 123c and the first ball 123a are hingedly coupled to each other, and the rotation (e.g., a third rotation) of the first hinge 123c by the first bearing 123d. The effect of the complex rotational motion of the first rotational articulation member 123 will be further described with reference to the configurations of the third housing 150 and the fourth housing 160.

Hereinafter, a configuration of the second housing 130 of the wearable display device according to an exemplary embodiment will be described with reference to FIGS. 1 and 3 and the aforementioned configuration of the first housing 120.

As illustrated in FIG. 1, one end of the second housing 130 may be disposed opposite to the front end of the first housing 120. This end may be referred to hereinafter as the front end of the second housing 130. The second housing 130 is formed in an L shape that corresponds to the shape of the first housing 120, and may serve as an arm of the glasses which comes into contact with an upper portion of a user's temple when the user wears the wearable display device 100 on his or her head. That is, as can be seen from FIG. 1, when a user wears the wearable display device 100 on his or her head, the first housing 120 comes into contact with an upper portion of the user's right temple, and the second housing 130 comes into contact with an upper portion of the user's left temple. Similar to the first housing 120, the second housing 130 includes a hollow space formed therein, and a circuit unit and a communication module may be disposed in the second housing 130 to allow for the exchange of data with the first housing 120. In an exemplary embodiment, a communication module may be disposed in the second housing 130.

According to exemplary embodiments, at least one circuit unit of the circuit units of the first housing 120 and the second housing 130 may be operatively coupled to at least one of a variety of elements including, for example, an image capturing module, a heart rate measuring module, a gravity sensor, a position sensor, etc.

The second housing 130 includes an accommodating groove 131 and second recessed portions 132.

The accommodating groove 131 is formed in one surface of the second housing 130 and is shaped and dimensioned to receive a stopper block 143 of the sliding unit 140 that connects the first housing 120 and the second housing 130 to each other. Therefore, as illustrated in FIG. 3, when the wearable display device 100 is not attached to the body of the user, the wearable display device 100 may be fixed to the portable terminal 10 by sliding the sliding unit 140 to decrease the distance between the first housing 120 and the second housing 130.

The second recessed portions 132 are formed within regions at which the second housing 130 comes into contact with the user when the user wears the wearable display device 100. As illustrated in FIG. 1, the second recessed portions 132 may be formed in a surface of the second housing 130 which faces the surface of the first housing 120 that includes the first recessed portions 122. Similar to the first recessed portions 122, the second recessed portions 132 may be formed in an x-axis directional surface of the second housing 130, the number of second recessed portions 132 may be two or more, and the second recessed portions 132 may extend along the y-axis direction of FIG. 1. As illustrated in FIG. 3, the two or more protruding portions 11 formed on the portable terminal 10 may be fitted into the second recessed portions 132, respectively, such that the portable terminal 10 and the wearable display device 100 may be attached to each other. As described above, when the wearable display device 100 is not attached to the body of the user, both lateral sides of the wearable display device 100 may be attached to the lateral sides of the portable terminal 10 in a balanced manner, such that when the user does not wear the wearable display device 100, the wearable display device 100 may be conveniently stored and carried.

Hereinafter, a second rotational articulation member will be described with reference to FIGS. 4 and 5 and the aforementioned configuration of the first rotational articulation member 123.

A second rotational articulation member 133 is a structure that is coupled to an end of the second housing 130 that is opposite to the front end of the second housing 130. Hereinafter, this end may be referred to as the rear end of the second housing 130. The second rotational articulation member 130 is rotatably fixed to the second housing 130. The second rotational articulation member 133 includes a second ball 133a, a second socket 133b, a second hinge 133c, and a second bearing 133d. The detailed configuration and functionality of the second rotational articulation member 133, including the rotational motion of the second rotational articulation member 133, are the same as that of the aforementioned first rotational articulation member 123.

For example, a fitting groove into which the second ball 133a is fitted is formed in a surface of the second socket 133b of the second rotational articulation member 133, the surface of the second socket 133b that is opposite to the surface in which the fitting groove is formed is connected to the fourth housing 160, the second hinge 133c is rotatably coupled to the other end of the second housing 130 and hingedly coupled to the second ball 133a, and the second bearing 133d is disposed between the other end of the second housing 130 and the second hinge 133c.

Thus, according to exemplary embodiments of the present invention, the second rotational articulation member 133 of the wearable display device 100 is configured to simultaneously perform the rotation (e.g., a first rotation) that is performed by the configuration in which the second ball 133a and the second socket 133b are coupled to each other, the rotation (e.g., a second rotation) that is performed by the configuration in which the second hinge 133c and the second ball 133a are hingedly coupled to each other, and the rotation (e.g., a third rotation) of the second hinge 133c by the second bearing 133d.

Figure 6:
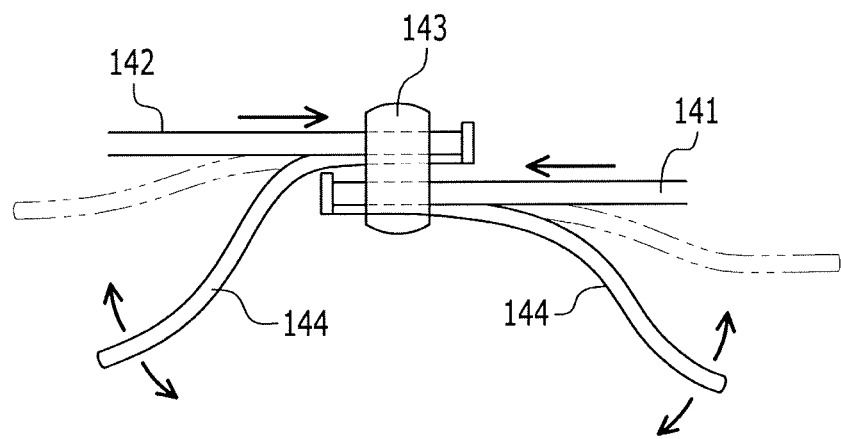
FIG. 6 is a view schematically illustrating a sliding operation of a sliding unit of the wearable display device according to an exemplary embodiment of the present invention.

FIG. 6 is a view schematically illustrating a sliding operation of the sliding unit of the wearable display device according to an exemplary embodiment of the present invention.

Hereinafter, the sliding unit 140 of the wearable display device 100 according to an exemplary embodiment of the present invention will be described with reference to FIGS. 1 and 6.

The sliding unit 140 may connect one end of the first housing 120 and one end of the second housing 130 to each other. For example, the sliding unit 140 may connect a portion of the front end of the first housing 120 to a portion of the front end of the second housing 130. The sliding unit 140 includes a first frame 141, a second frame 142, a stopper block 143, and a pair of wire members 144. As illustrated in FIG. 6, the sliding unit 140 is slidably connected such that the distance between the first housing 120 and the second housing 130 may be adjusted. The amount of the adjustment (e.g., the distance between the first housing 120 and the second housing 130) may be varied according to a user's body size and according to the size of the portable terminal 10. That is, the sliding unit 140 may be adjusted such that the wearable display device 100 may be fixed to the portable terminal 10 and then stored when the wearable display device 100 is not attached to the user's body (see FIG. 3).

At least a part of the first frame 141 is accommodated within the first housing 120 while being directed toward one end of the first housing 120, and may extend toward the second housing 130, as shown in FIG. 1. For example, at least a part of the first frame 141 may be accommodated within the front end of the first housing 120, as shown in FIG. 1. As illustrated in FIG. 6, the first frame 141 may slide from the first housing 120 toward the second housing 130.

At least a part of the second frame 142 is accommodated within the second housing 130 while being directed toward one end of the second housing 130, and may extend toward the first housing 120, as shown in FIG. 1. For example, at least a part of the second frame 142 may be accommodated within the front end of the second housing 130, as shown in FIG. 1. Thus, the second frame 142 may slide from the second housing 130 toward the first housing 120 in a direction opposite to the direction in which the first frame 141 slides.

The stopper block 143 receives the first frame 141 and the second frame 142, and the first frame 141 and the second frame 142 penetrate the stopper block 143. The stopper block 143 may restrict the sliding operations of the first frame 141 and the second frame 142 to prevent the first frame 141 and the second frame 142 from deviating from their respective sliding tracks. In an exemplary embodiment, both ends of the first frame 141 and both ends of the second frame 142 are formed to have a larger external diameter than a through-hole of the stopper block 143, such that the first frame 141 and the second frame 142 may move while maintaining the sliding tracks illustrated in FIG. 6 without being removed from the stopper block 143.

When the user wears the wearable display device 100 on his or her head, the first frame 141, the second frame 142, and the stopper block 143 may serve as a bridge of the glasses which connects the first housing 120 and the second housing 130 to each other.

The pair of wires 144 may be formed to extend from the stopper block 143 in a direction in which the first frame 141 extends and in a direction in which the second frame 142 extends, respectively. As illustrated in FIG. 6, the pair of wires 144 may be connected with an end of the first frame 141 and an end of the second frame 142, respectively. The first wire that is connected to the first frame 141 extends toward the first housing 120, and the second wire that is connected to the second frame 142 extends toward the second housing 130.

As indicated by the elements drawn with dotted lines in FIG. 6 and by the arrows pointing to and from the pair of wires 144 in FIG. 6, the pair of wires 144 may be spread together with the first frame 141 and the second frame 142 as the distance between the first housing 120 and the second housing 130 becomes larger, and may be accommodated in the first housing 120 and the second housing 130 together with the first frame 141 and the second frame 142 as the distance between the first housing 120 and the second housing 130 becomes smaller.

The pair of wires 144 may be flexibly bent by external force in the directions of the arrows from positions drawn with dotted lines as illustrated in FIG. 6. Accordingly, the pair of wires 144 may be made of a material that may maintain a deformed shape thereof. That is, the pair of wires 144 may be spread together with the first frame 141 and the second frame 142, and may be flexibly bent such that the pair of wires 144 may serve as a nose pad of the glasses when the user wears the wearable display device 100 on his or her head.

Figure 7:
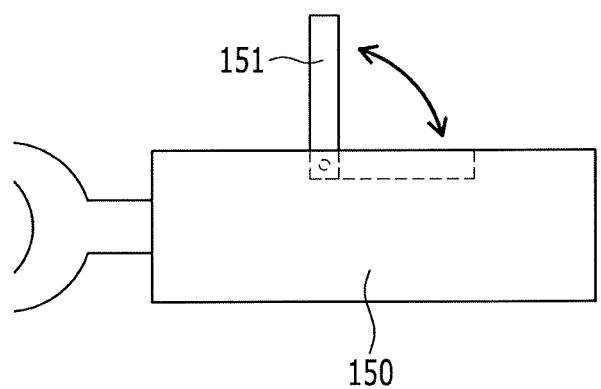
FIG. 7 is a view schematically illustrating the rotational motion of a first contact terminal of the wearable display device according to an exemplary embodiment of the present invention.
Figure 8:
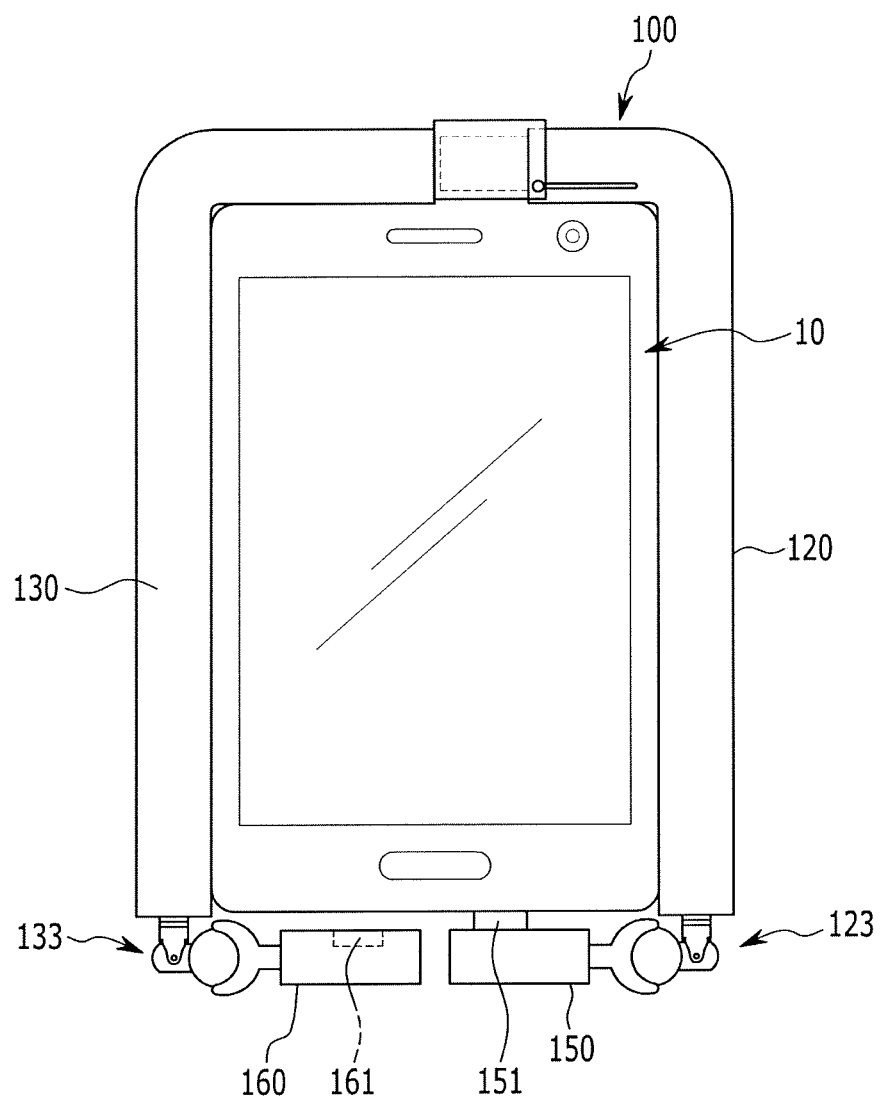
FIG. 8 is a view illustrating an appearance in which the first contact terminal of the wearable display device is electrically connected to the portable terminal according to an exemplary embodiment of the present invention.

FIG. 7 is a view schematically illustrating the rotational motion of a first contact terminal of the wearable display device according to an exemplary embodiment of the present invention. FIG. 8 is a view illustrating the first contact terminal of the wearable display device electrically connected to the portable terminal according to an exemplary embodiment of the present invention.

Hereinafter, the configurations of the third housing 150 and the fourth housing 160 according to an exemplary embodiment will be described with reference to FIGS. 1, 7 and 8.

The third housing 150 may be connected to the first socket 123b, and the fourth housing 160 may be connected to the second socket 133b. The third housing 150 and the fourth housing 160 are structures that have a bar shape and correspond to each other. At least one of the third housing 150 and the fourth housing 160 includes a hollow space into which a battery pack for supplying power to the circuit unit(s) may be disposed.

A first contact terminal 151 may be accommodated in one surface of the third housing 150. The first contact terminal 151 may be hingedly and rotatably coupled to one surface of the third housing 150, as illustrated in FIG. 7. A second contact terminal 161, which corresponds to the fourth housing 160, may be hingedly and rotatably coupled to one surface of the fourth housing 160, as illustrated in FIG. 1.

When the wearable display device 100 is attached to the portable terminal 10, at least one of the first contact terminal 151 and the second contact terminal 161 may be inserted into a charging socket positioned at a lower end of the portable terminal 10, and may electrically connect the portable terminal 10 and the wearable display device 100. As illustrated in FIG. 8, in an exemplary embodiment, the first contact terminal 151 is electrically connected to the portable terminal 10. However, it is to be understood that this configuration is an exemplary embodiment, and the portable terminal 10 may be electrically connected to any one of the first contact terminal 151 and the second contact terminal 161 in accordance with a position of a charging socket of the portable terminal 10, a position at which the battery of the wearable display device 100 is installed, etc.

As described above, the wearable display device 100 is electrically connected to the portable terminal 10 using the first and second contact terminals 151 and 161, thereby controlling any one of the wearable display device 100 and the portable terminal 10 to be charged with electricity (e.g., via the other attached device), and controlling the portable terminal 10 and the wearable display device 100 to exchange data.

According to exemplary embodiments of the present invention, the wearable display device 100 may be physically coupled to only the lateral sides of the portable terminal 10 via the first and second recessed portions 122 and 132 disposed on the lateral sides of the wearable display device 100 (e.g., the upper side of the wearable display device 100 extending between the two lateral sides is not physically coupled to the upper side of the portable terminal 10). The wearable display device 100 may be electrically connected to the portable terminal 10 through the first and second contact terminals 151 and 161. As a result, even though a separate charging dock or a separate data storage device may not be provided or available, the wearable display device 100 may be charged through the portable terminal 10, and data may be exchanged between the portable terminal 10 and the wearable display device 100 when the wearable display device 100 is not attached to the body of the user.

Figure 9:
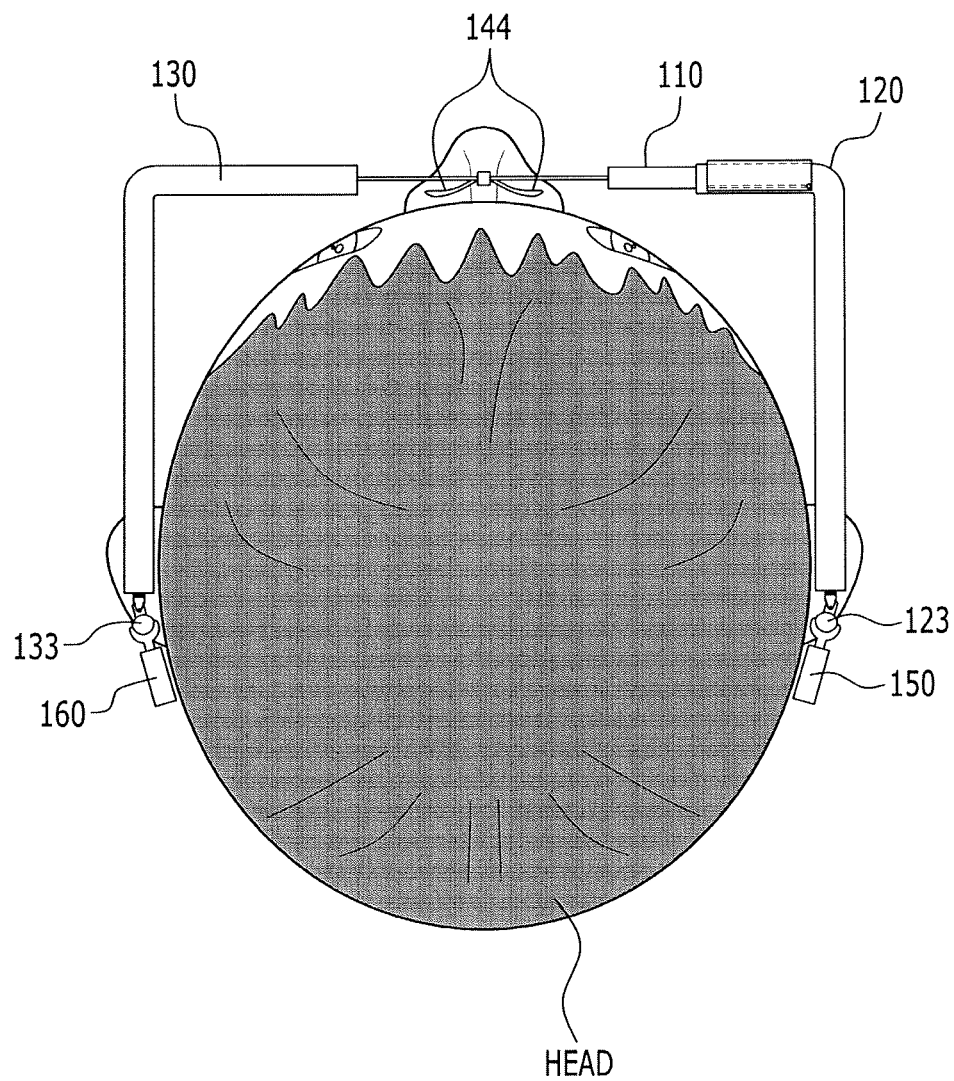
FIG. 9 is a view illustrating an exemplary embodiment of the wearable display device being worn on a user's head.

FIG. 9 is a view illustrating an exemplary embodiment of the wearable display device being worn on a user's head.

Hereinafter, various changes in the position of the third and fourth housings 150 and 160 of the wearable display device 100 according to exemplary embodiments will be described with reference to FIGS. 1 to 9.

As illustrated in FIG. 1, according to an exemplary embodiment, both the third and fourth housings 150 and 160 of the wearable display device 100 may be disposed in parallel with the y-axis direction.

When the wearable display device 100 is attached to the portable terminal 10, the third and fourth housings 150 and 160 may be hingedly rotated via the first and second hinges 123c and 133c such that they surround a lower side of the portable terminal 10, as illustrated in FIG. 8.

As illustrated in FIG. 9, when the user wears the wearable display device 100 on his or her head, the wearable display unit 110 is disposed such that it is spaced apart from the user's eyes, the first housing 120 comes into contact with the user's right temple and extends to an upper portion of the user's right ear, the second housing 130 comes into contact with the user's left temple and extends to an upper portion of the user's left ear, and the pair of wires 144 is positioned to rest on the user's nose. In this case, the third and fourth housings 150 and 160 may be rotated by the first and second rotational articulation members 123 and 133, respectively, such that the third and fourth housings 150 and 160 may be disposed to surround rear portions of the user's left and right ears, respectively. That is, the third and fourth housings 150 and 160 may serve as a tip of the glasses.

It is to be understood that exemplary embodiments of the present invention are not limited to the aforementioned configurations. For example, in a case in which the wearable display device 100 is attached to a user's wrist, the display unit 110 may be disposed on a back of the user's hand, the first and second housings 120 and 130 may come into contact with both lateral surfaces of the user's wrist, and the third and fourth housings 150 and 160 may be disposed to surround a lower side of the user's wrist. That is, in order to keep the wearable display device 100 securely attached to the user's wrist, the first to fourth housings may serve as a band of a wrist watch that is formed to surround an outer circumference of the user's wrist.

As described above, according to exemplary embodiments of the present invention, the positions of the third and fourth housings 150 and 160 of the wearable display device 100 may be variously changed through the complex rotational motions permitted by the first and second rotational articulation members 123 and 133, such that the wearable display device 100 may be attached to various portions of a user's body such as, for example, the user's head, arm, or leg. When the wearable display device 100 is not attached to the body of the user, the first and/or second contact terminals 151 and 161 may be inserted into the charging socket of the portable terminal 10 such that the portable terminal 10 or the wearable display device 100 may be charged (e.g., via the other attached device), or such that data exchange may be performed.

As described above, the wearable display device 100 according to exemplary embodiments of the present invention may be attached to portions of a user's body such as, for example, the user's head, arm, or leg, and may be fixed to a portable mobile communication terminal 10 (e.g., a smartphone) or the like when the wearable display device 100 is not attached to the body of the user, allowing the wearable display device 100 to be conveniently carried and stored when not worn by the user. Further, the wearable display device 100 is electrically connected to the portable terminal 10. As a result, even though a separate charging dock or a separate data storage device may not be provided or available, the wearable display device 100 may be charged via the portable terminal 10 (or vice versa) and may exchange data with the portable terminal 10. That is, exemplary embodiments of the present invention allow the user to consistently use the wearable display device 100 without having to connect the wearable display device 100 to a separate proprietary charging dock or data storage device to charge the wearable display device 100 or exchange data between the wearable display device 100 and the portable terminal 10. Thus, since the user is not required to carry a separate charging dock or data storage device to use with the wearable display device 100, exemplary embodiments of the present invention provide a wearable display device 100 that has a high degree of portability and compatibility.

While the present invention has been particularly shown and described with reference to the exemplary embodiments thereof, it is to be understood by those of ordinary skill in the art that various changes in form and detail may be made therein without departing from the spirit and scope of the present invention as defined by the following claims.

What is claimed is:

1. A wearable display device, comprising:
a display unit configured to transmit an image;
a first housing having a first end connected to the display unit;
a second housing having a first end disposed opposite to the first end of the first housing;
an accommodating groove formed in the first end of the second housing; and
a sliding unit configured to slidably connect the first housing and the second housing to each other, wherein the sliding unit comprises:
a first frame disposed at the first end of the first housing and extending toward the first end of the second housing;
a second frame disposed at the first end of the second housing and extending toward the first end of the first housing; and a stopper block configured to receive the first frame and the second frame, wherein the first frame and the second frame penetrate the stopper block,
wherein the accommodating groove is shaped and dimensioned to receive the stopper block.

2. The wearable display device of claim 1, wherein the first housing and the second housing are each formed in an L shape.

3. The wearable display device of claim 1, further comprising:
a cover coupled to the first housing and configured to slide along an outer portion of the first housing to cover at least a part of the display unit.

4. The wearable display device of claim 1, further comprising:
two or more first recessed portions formed in one surface of the first housing.

5. The wearable display device of claim 1, further comprising:
a first rotational articulation member rotatably coupled to a second end of the first housing.

6. The wearable display device of claim 5, wherein the first rotational articulation member comprises:
a first hinge rotatably coupled to the second end of the first housing;
a first ball hingedly coupled to the first hinge; and
a first socket comprising a U-shaped fitting groove shaped and dimensioned to receive the first ball.

7. The wearable display device of claim 5, further comprising:
a third housing connected to the first rotational articulation member.

8. The wearable display device of claim 7, wherein the third housing comprises:
a first contact terminal hingedly and rotatably coupled to one surface of the third housing.

9. The wearable display device of claim 1, further comprising:
two or more second recessed portions formed in one surface of the second housing.

10. The wearable display device of claim 1, further comprising:
a second rotational articulation member rotatably coupled to a second end of the second housing.

11. The wearable display device of claim 10, wherein the second rotational articulation member comprises:
a second hinge rotatably coupled to the second end of the second housing;
a second ball hingedly coupled to the second hinge; and
a second socket comprising a U-shaped fitting groove shaped and dimensioned to receive the second ball.

12. The wearable display device of claim 10, further comprising:
a fourth housing connected to the second rotational articulation member.

13. The wearable display device of claim 12, wherein the fourth housing comprises:
a second contact terminal hingedly and rotatably coupled to one surface of the fourth housing.

14. The wearable display device of claim 1, wherein the sliding unit further comprises:
a first wire member extending from the stopper block toward the first frame in a first direction in which the first frame extends; and
a second wire member extending from the stopper block in a second direction in which the second frame extends.

15. A wearable display device, comprising:
a display unit configured to transmit an image;
a first housing having a first end connected to the display unit;
a second housing having a first end disposed opposite to the first end of the first housing;
a sliding unit configured to slidably connect the first housing and the second housing to each other;
a first rotational articulation member rotatably coupled to a second end of the first housing;
a second rotational articulation member rotatably coupled to a second end of the second housing;
a third housing connected to the first rotational articulation member;
a fourth housing connected to the second rotational articulation member; and
at least one contact terminal hingedly and rotatably coupled to at least one surface of the third housing and one surface of the fourth housing.

16. The wearable display device of claim 15,
wherein the first rotational articulation member comprises:
a first hinge rotatably coupled to the second end of the first housing;
a first ball hingedly coupled to the first hinge; and
a first socket comprising a fitting groove shaped and dimensioned to receive the first ball, and
wherein the second rotational articulation member comprises:
a second hinge rotatably coupled to the second end of the second housing;
a second ball hingedly coupled to the second hinge; and
a second socket comprising a fitting groove shaped and dimensioned to receive the second ball.

17. The wearable display device of claim 16, wherein the sliding unit comprises:
a first frame disposed at the first end of the first housing and extending toward the first end of the second housing;
a second frame disposed at the first end of the second housing and extending toward the first end of the first housing;
a stopper block configured to receive the first frame and the second frame, wherein the first frame and the second frame penetrate the stopper block; and
an accommodating groove formed in the first end of the second housing and shaped and dimensioned to receive the stopper block.

18. The wearable display device of claim 17, wherein the sliding unit further comprises:
a first wire member extending from the stopper block toward the first frame in a first direction in which the first frame extends; and
a second wire member extending from the stopper block in a second direction in which the second frame extends.

19. A wearable display device, comprising: a display unit configured to transmit an image; a first housing having a first end connected to the display unit, and a second end disposed opposite to the first end of the first housing: a second housing having a first end disposed opposite to the first end of the first housing, and a second end disposed opposite to the first end of the second housing; a sliding unit configured to slidably connect the first housing and the second housing to each other; and a plurality of recessed portions formed on at least one of a lateral side of the first housing between the first and second ends of the first housing, and a lateral side of the second housing between the first and second ends of the second housing, wherein the recessed portions face the lateral side of the second housing when the recessed portions are formed on the lateral side of the first housing, and the recessed portions face the lateral side of the first housing when the recessed portions are formed on the lateral side of the second housing; wherein the sliding unit comprises: a first frame disposed at the first end of the first housing and extending toward the first end of the second housing; a second frame disposed at the first end of the second housing and extending toward the first end of the first housing; a stopper block configured to receive the first frame and the second frame, wherein the first frame and the second frame penetrate the stopper block; and an accommodating groove formed in the first end of the second housing and shaped and dimensioned to receive the stopper block.

\* \* \* \* \*